United States Patent
Gildert et al.

(10) Patent No.: US 10,180,733 B2
(45) Date of Patent: Jan. 15, 2019

(54) SYSTEMS, DEVICES, AND METHODS FOR FOOT CONTROL OF ROBOTS

(71) Applicant: Kindred Systems Inc., Vancouver (CA)

(72) Inventors: Suzanne Gildert, Burnaby (CA); Steven Varghese Jacob, Brampton (CA)

(73) Assignee: Kindred Systems Inc., Vancouver (CA)

( * ) Notice: Subject to any disclaimer, the term of this patent is extended or adjusted under 35 U.S.C. 154(b) by 0 days.

(21) Appl. No.: 15/386,325

(22) Filed: Dec. 21, 2016

(65) Prior Publication Data

US 2017/0173786 A1 Jun. 22, 2017

Related U.S. Application Data

(60) Provisional application No. 62/271,130, filed on Dec. 22, 2015.

(51) Int. Cl.
*G06F 3/01* (2006.01)
*G06F 3/0338* (2013.01)
(Continued)

(52) U.S. Cl.
CPC ........... *G06F 3/0338* (2013.01); *G05G 9/047* (2013.01); *G06F 3/011* (2013.01); *G06F 3/0334* (2013.01);
(Continued)

(58) Field of Classification Search
CPC ......... B25J 9/161; G06F 3/0338; G06F 3/011; G06F 3/0334; G05G 9/047; H01H 25/04; G05B 2219/35448
See application file for complete search history.

(56) References Cited

U.S. PATENT DOCUMENTS

| 1,597,416 A | 8/1926 | Mirick |
| 3,300,594 A * | 1/1967 | Paine .................. H01H 19/563 200/11 G |

(Continued)

OTHER PUBLICATIONS

Bongers, "Physical Interfaces in the Electronic Arts: Interaction Theory and Interfacing Techniques for Real-time Performance", Marcelo M. Wanderley and Marc Battier, eds., "*Trends in Gestural Control of Music*" electronic book by IRCAM—Centre Pompidou, pp. 41-70, 2000.

(Continued)

*Primary Examiner* — Corbett B Coburn
(74) *Attorney, Agent, or Firm* — Seed IP Law Group LLP

(57) ABSTRACT

A user interface device includes a frame, rigid body in rotary engagement with the frame, a plurality of force sensors, which in response to force acting on the frame produces information that represents a first force component in a first direction with respect to the frame, and a second force component in a second direction with respect to the frame; and an angle sensor, which in response to torque applied to the rigid body produces information that represents rotary movement of the rigid body with respect to the frame about an axis extending vertically through the rigid body. The rigid body can be sized and dimensioned to accommodate one or more feet of a user. The user interface device advantageously combines or mixes isometric and isotonic control input or sensors.

35 Claims, 8 Drawing Sheets

(51) Int. Cl.
*G05G 9/047* (2006.01)
*G06F 3/033* (2013.01)
*H01H 25/04* (2006.01)

(52) U.S. Cl.
CPC ... *H01H 25/04* (2013.01); *G05B 2219/35448* (2013.01)

(56) References Cited

U.S. PATENT DOCUMENTS

| | | | | |
|---|---|---|---|---|
| 3,434,342 A * | 3/1969 | Kazmarek | | G01L 5/164 273/148 B |
| 3,564,936 A * | 2/1971 | Korell | | B64C 13/04 74/483 R |
| 4,409,479 A | 10/1983 | Sprague et al. | | |
| 4,488,017 A * | 12/1984 | Lee | | G06F 3/0334 200/17 R |
| 4,751,505 A | 6/1988 | Williams et al. | | |
| 4,817,950 A * | 4/1989 | Goo | | A63B 69/0093 200/52 A |
| 5,139,261 A * | 8/1992 | Openiano | | A61B 5/1036 463/36 |
| 5,405,152 A * | 4/1995 | Katanics | | A63F 13/06 273/148 B |
| D368,496 S * | 4/1996 | Seger | | A63F 13/06 D14/419 |
| 5,621,207 A * | 4/1997 | O'Mara | | G05G 9/047 250/221 |
| 5,635,957 A * | 6/1997 | Feierbach | | G06F 3/03543 345/163 |
| 5,689,285 A * | 11/1997 | Asher | | G05G 9/047 200/6 R |
| 5,724,264 A * | 3/1998 | Rosenberg | | B25J 9/1692 700/161 |
| 5,745,055 A * | 4/1998 | Redlich | | G06F 3/0334 341/20 |
| 5,860,861 A * | 1/1999 | Lipps | | A63F 13/06 273/148 B |
| 5,886,685 A * | 3/1999 | Best | | G06F 3/0334 345/156 |
| 6,091,402 A * | 7/2000 | Howell | | G06F 3/0334 345/157 |
| 6,543,769 B1 * | 4/2003 | Podoloff | | A63B 21/0004 273/148 B |
| 6,624,802 B1 * | 9/2003 | Klein | | A63F 13/06 273/109 |
| 7,008,359 B2 * | 3/2006 | Fan | | A63B 22/18 482/146 |
| 7,488,177 B2 * | 2/2009 | Pearson | | A63B 69/0093 434/247 |
| 7,578,505 B2 * | 8/2009 | McIlvain | | A63F 7/0005 463/36 |
| 8,021,269 B2 * | 9/2011 | Jung | | A43B 3/0005 482/4 |
| 8,517,835 B2 * | 8/2013 | Dwyer | | A63F 13/06 273/148 B |
| 9,101,831 B2 * | 8/2015 | Sauerbrei | | A63F 13/10 |
| 9,134,187 B1 * | 9/2015 | Organ | | G05G 9/047 |
| 9,446,307 B2 * | 9/2016 | Klein | | A63F 13/807 |
| 2002/0024503 A1 * | 2/2002 | Armstrong | | G05G 9/047 345/167 |
| 2003/0030399 A1 * | 2/2003 | Jacobs | | G05D 1/0274 318/568.16 |
| 2003/0214481 A1 * | 11/2003 | Xiong | | G06F 3/017 345/157 |
| 2008/0261696 A1 * | 10/2008 | Yamazaki | | A63F 13/06 463/39 |
| 2015/0029047 A1 * | 1/2015 | Levasseur | | G05G 9/047 341/21 |
| 2016/0243701 A1 | 8/2016 | Gildert et al. | | |
| 2016/0328028 A1 * | 11/2016 | Khojasteh | | G06F 3/0334 |

OTHER PUBLICATIONS

Brooks et al., "Hand Controllers for Teleoperation—A State-of-the-Art Technology Survey and Evaluation," National Aeronautics and Space Administration—Jet Propulsion Laboratory, Mar. 1, 1985, 97 pages.

Buxton, "A Directory of Source for Input Technologies" web document, pp. 1, 2, 14, and 15, last updated Jul. 4, 2012, accessed Sep. 6, 2017, url: https://www.billbuxton.com/InputSources.html, 2012.

Buxton, "Buxton Collection" web document, Article Nos. "Home", "Pedals", 153-156, accessed Sep. 7, 2017, url: https://www.microsoft.com/buxtoncollection, 2011.

Diegel et al., "Improved Mecanum Wheel Design for Omni-directional Robots," *Proc. 2002 Australasian Conference on Robotics and Automation*, Auckland, Nov. 27-29, 2002, pp. 117-121.

Freeman et al., "The Role of Physical Controllers in Motion Video Gaming," *Proceedings of Designing Interactive Systems (DIS)*, Newcastle, UK, Jun. 11-15, 2012, pp. 701-710.

Natapov et al., "ISO 9241-9 Evaluation of Video Game Controllers," *Graphics Interface Conference 2009*, Kelowna, British Columbia, Canada, May 25-27, 2009, pp. 223-230.

Nexus Automation Ltd., "Mecanum wheels (Ilon wheel)," Brochure from Nexus Automation Ltd., 2015, 2 pages.

Pearson et al., "Of moles and men: the design of foot controls for workstations", *Proceedings of the SIG CHI Conference on Human Factors in Computing Systems* in Boston, Massachusetts, USA, 17 (CHI '86), ISBN:0-89791-180-6, DOI:10.1145/22627.22392, pp. 333-339, Apr. 13, 1986.

Silfverberg et al., "An Isometric Joystick as a Pointing Device for Handheld Information Terminals," *Proceedings of Graphics Interface*, pp. 119-126, 2001.

Udengaard et al., "Analysis, Design, and Control of an Omnidirectional Mobile Robot in Rough Terrain," *Journal of Mechanical Design* 131:121002-1-121002-11, 2009. (11 pages).

Velloso et al. "The Feet in Human-Computer Interaction: A Survey of Foot-Based Interaction" *ACM Computing Surveys* (CSUR) 48(2):21, DOI:10.1145/2816455, Apr. 13, 1986, 36 pages.

Zhai et al., "Human Performance Evaluation of Manipulation Schemes in Virtual Environments," *Proceedings of IEEE Virtual Reality Annual International Symposium (VRAIS)*, Seattle, WA, Sep. 1993, 7 pages.

Zhai, "Investigation of Feel for 6DOF Inputs: Isometric and Elastic Rate Control for Manipulation in 3D Environments," *Proceedings of the Human Factors and Ergonomics Society—37th Annual Meeting*, 1993, 5 pages.

Zhai, "User Performance in Relation to 3D Input Device Design," *ACM SIGGRAPH Computer Graphics* 32(4):51-54, 1998.

* cited by examiner

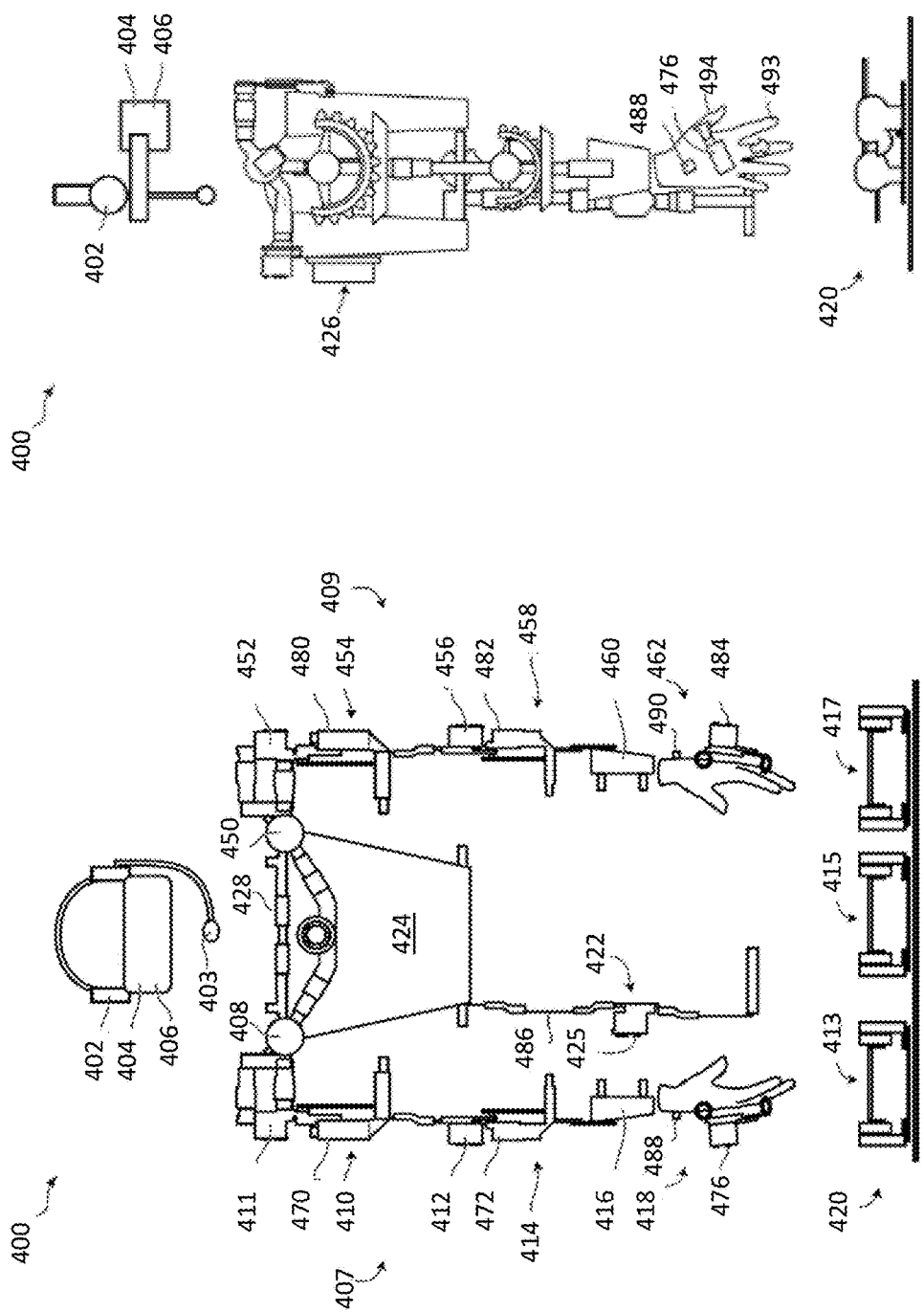

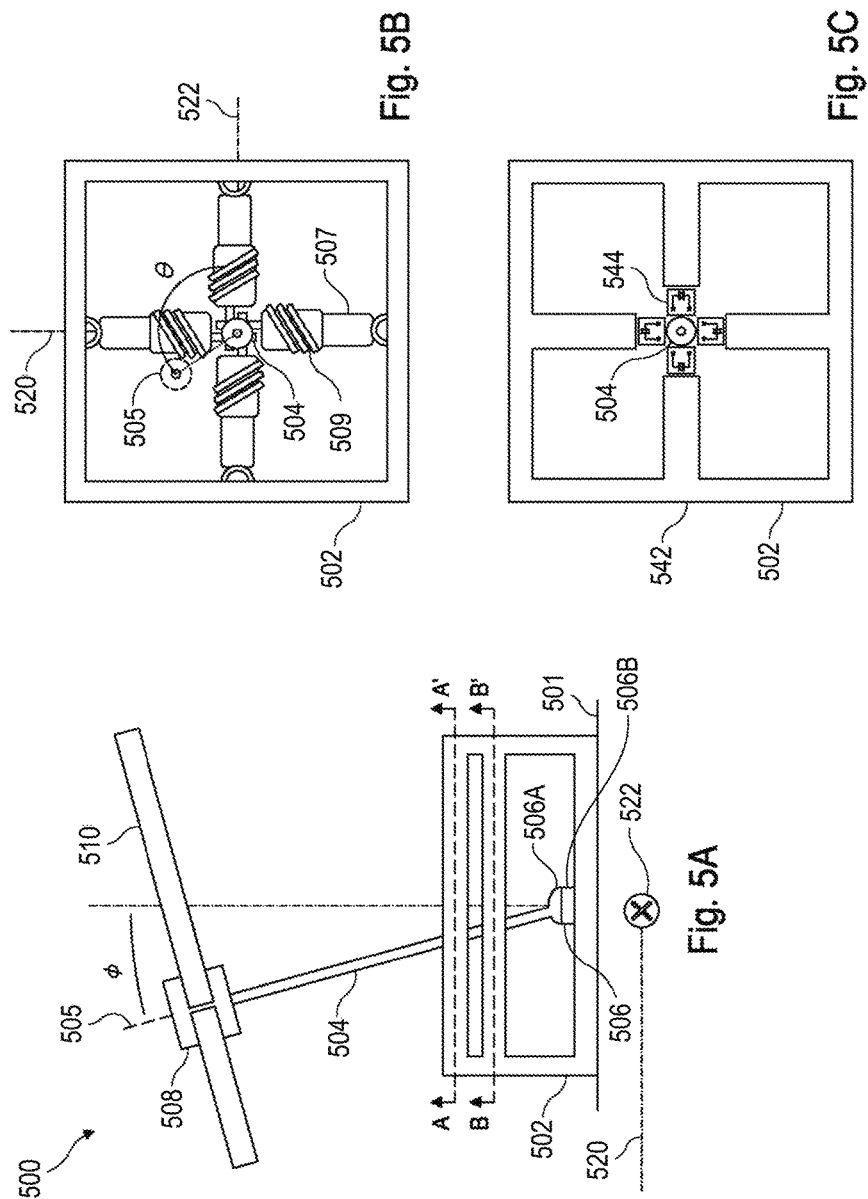

SYSTEMS, DEVICES, AND METHODS FOR FOOT CONTROL OF ROBOTS

BACKGROUND

Technical Field

This disclosure generally relates to the field of user interface devices, and/or operation of robots.

Description of the Related Art

Robots

Robots are systems, machines, or devices that are capable of carrying out one or more tasks. A robot is an electro-mechanical machine controlled by circuitry and/or a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without active control of an operator. Hybrid robots exist in which some functions are autonomous while others are operator controlled. As well, a robot includes computational resources to preform computational tasks. The computational tasks can be in aid of the physical tasks.

Pointing Device

A pointing device is a machine that allows a user to input data to a computer using gestures, e.g., point, click, and drag. A common example of which is a hand held mouse where movement across a tangible surface is replicated by movements of a cursor in a display.

BRIEF SUMMARY

A user interface device may be summarized substantially as described and illustrated herein.

A system may be summarized as including a user interface device and a robot substantially as described and illustrated herein.

A method of operation of a control device may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures in which:

FIG. 4A a front view and FIG. 4B is a side view illustrating an exemplary human operator interface;

FIGS. 5A-5C are schematic views illustrating an exemplary human operator interface including isometric and isotonic component;

DETAILED DESCRIPTION

Figure 1:
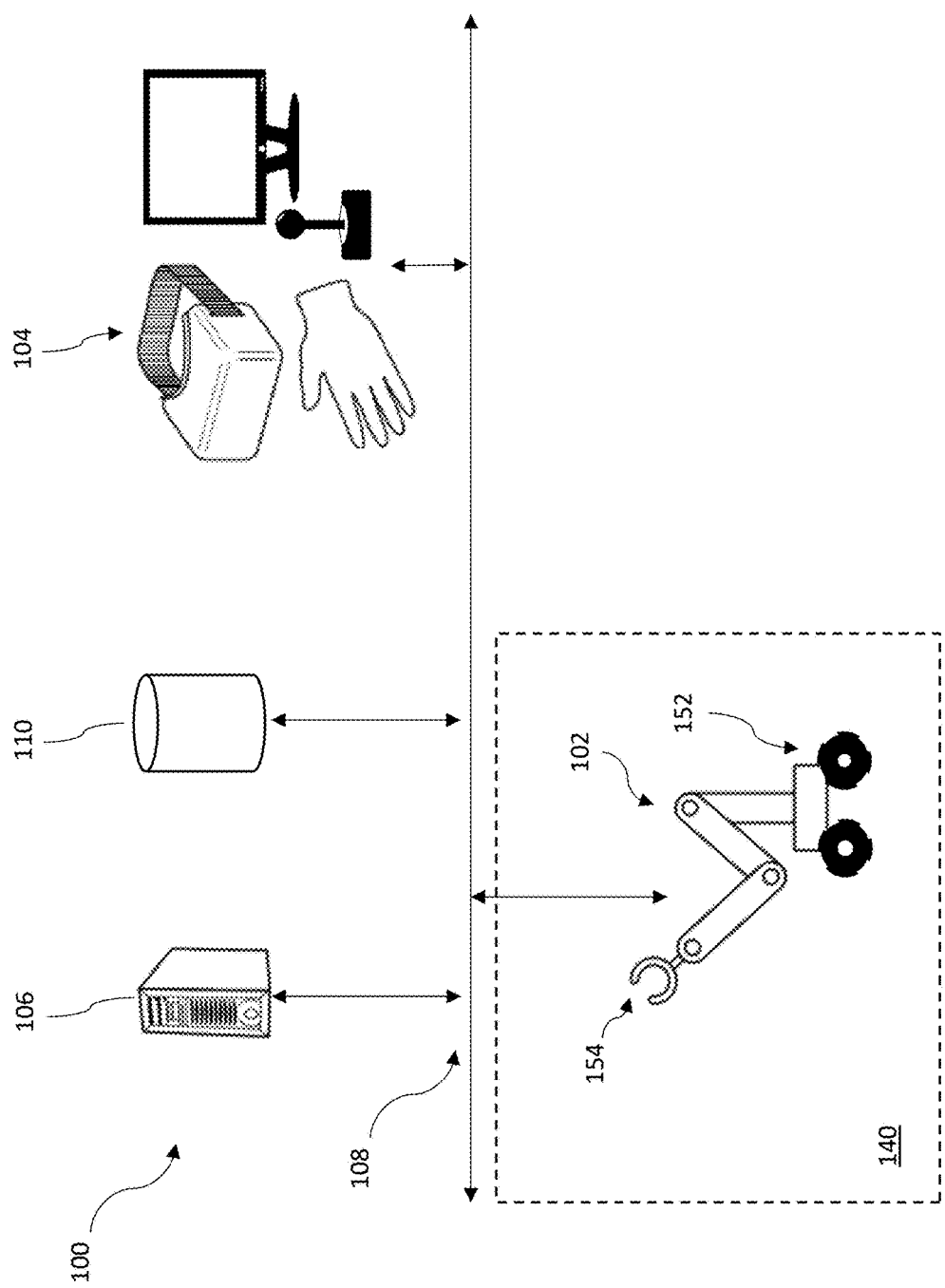
FIG. 1 is a schematic diagram illustrating a portion of a system including a user interface device.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with user interfaces and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a problem-solving system including "a computer server" includes a single computer server, or two or more computer servers. It should also be noted that the term "or" is generally employed in its sense including "and/or" unless the content clearly dictates otherwise.

The headings provided herein are for convenience only and do not interpret the scope or meaning of the embodiments.

Traditional pointing devices excel at tasks that resemble their physical analog. For example, the hand-held mouse in combination with a cursor within a virtual desktop in a display is a valid abstraction of a hand over a tangible desk. Just as a hand can moved to a folder, open the folder, and present a document within, so can a mouse via move and selection (e.g., click) actions. However, many tasks are different from the manipulation of files, for example, the operation of robots, navigation of virtual spaces, and other operations. For example, a human operator at an operator interface, e.g., see FIG. 3, may need to employ all hands and arms to pilot a robot. Applicants propose systems, devices, articles, and methods including isotonic and isometric components that assist a human operator and a processor-based device to more efficiently perform many tasks such as guide a robot in motion and accomplishment of physical tasks, or the like. Applicants propose systems, devices, articles, and methods associated with a user input device with isometric input for two axes and isotonic input for a third axis. Applicants propose systems, devices, articles, and methods associated with a rotary platform that assist a human operator and a processor to more efficiently perform many tasks, such as, navigate a virtual space.

FIG. 1 shows an exemplary system 100, including at least one processor based device, in accordance with the present system, devices, articles, and method. As shown, the system 100 includes a robot 102, an operator interface 104, and a computer 106, all communicatively coupled via a network or non-network communication channel 108. System 100 can include a nontransitory computer- and processor-readable storage device 110 which stores processor-executable instructions and/or processor-readable data.

Operator interface 104 can include one or more user input devices, including those described herein, and one or more user output devices, for instance a display (e.g., LCD or OLED screen), head mounted display, and/or speaker. In some or all implementations, operator interface 104 includes user interface device 500 shown in FIG. 5 and described herein. In some or all implementations, operator interface 104 includes user interface device 600 shown in FIG. 6 and described herein.

Examples, of computer 106 are described herein. Computer 106 may facilitate or coordinate the operator of system 100.

Examples of a suitable network or non-network communication channel 108 include a wire based network or non-network communication channel, optical based network or non-network communication channel, wireless network or non-network communication channel, or a combination of wired, optical, and/or wireless network or non-network communication channels.

In some or all implementations, a human operator at operator interface 104 pilots robot 102. The robot 102 operates in, and receives data about, an environment 140 that comprises a physical space. The term "about" is employed here in the sense of represent, characterize, or summarize.

A robot, like robot 102, is an electro-mechanical machine controlled by circuitry and/or a processor following processor-executable instructions; a human operator controllable electro-mechanical machine; a robotic subsystem (or apparatus) of another machine including a robot; or the like. A robot performs physical tasks, for example, work with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensor. A robot can be included in a larger system like system 100.

A robot typically includes a propulsion or motion subsystem comprising of one or more motors, solenoids or other actuators, and associated hardware (e.g., drivetrain, wheel(s), treads), to propel the robot in a physical space. An example of a motion subsystem is drivetrain and wheels 152. The space does not need to be horizontal or terrestrial. Examples of spaces include water, air, vertical spaces, outer space, and the like.

A robot includes a manipulation subsystem comprising one or more appendages, such as, one or more arms and/or one or more associated end-effectors. An end-effector is a device attached to a robotic arm designed to interact with the environment. End-effectors for robot operating in unstructured environments are devices of complex design. Ideally, these are capable of performing many tasks, including for example grasping or gripping or otherwise physically releasably engaging or interacting with an object. For example, manipulation subsystem 218 includes arm and end-effector 154.

While system 100 is illustrated with one robot 102, and one computer 106, any of the various implementations can include a greater or lesser number of robots (e.g., robot 102), computers (e.g., computer 106) and operator interfaces (e.g., operator interface 104). At least one implementation even omits any robots (e.g., robot 102). A human operator at operator interface 104 interacts with operator interface to navigate a virtual environment (not shown).

Figure 2:
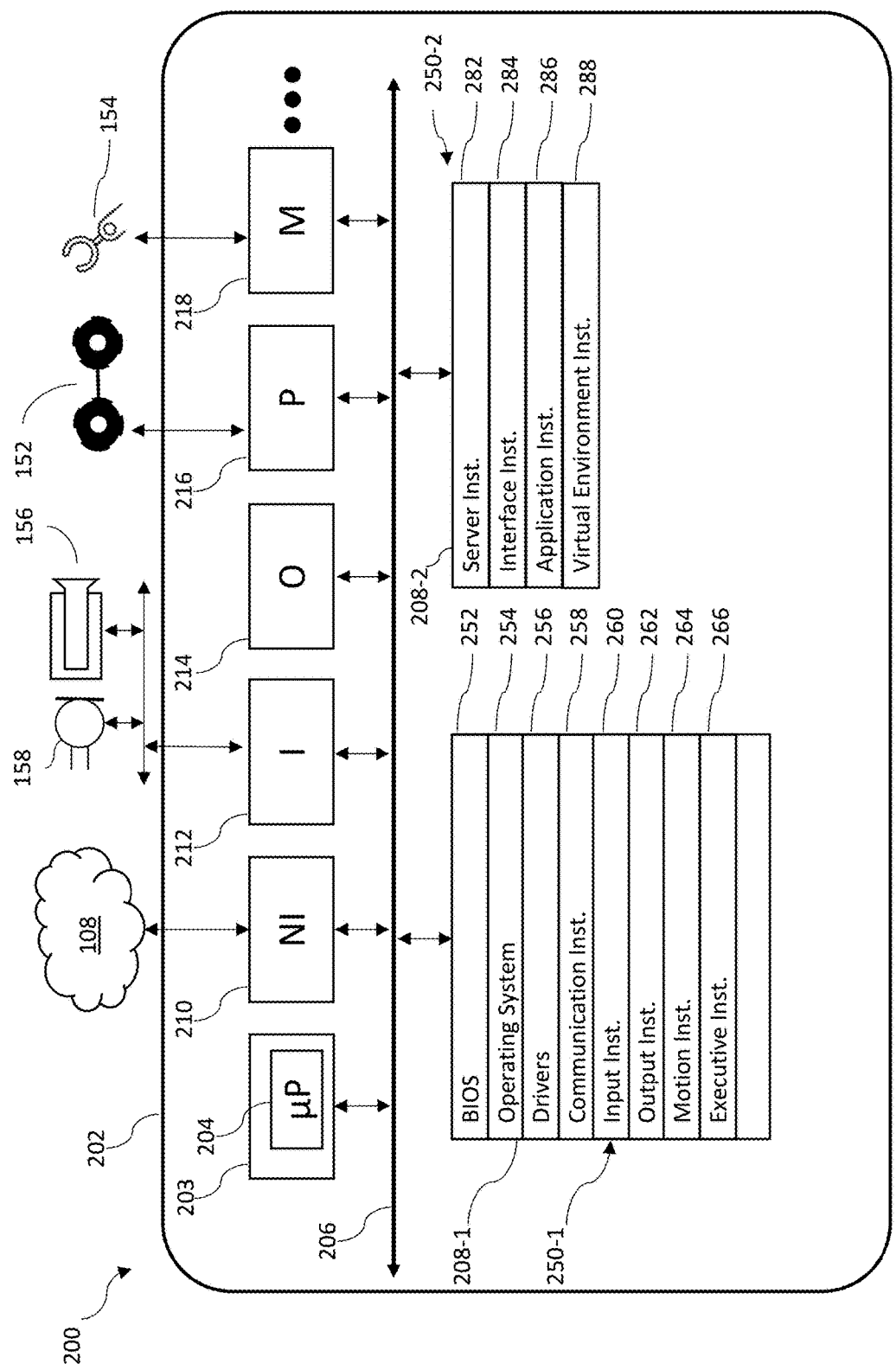
FIG. 2 is a schematic view illustrating an exemplary robot suitable for inclusion in the system of FIG. 1.

FIG. 2 schematically shows parts of devices including at least one processor. An example of a device including at least one processor is an exemplary robotic apparatus, such as robot 200. Robot 200 includes at least one body or housing 202, and a control subsystem 203 that includes at least one processor 204, at least one nontransitory computer- and processor-readable storage device 208, and at least one bus 206 to which the at least one processor 204 and the at least one nontransitory computer- or processor-readable storage device 208 are communicatively coupled. In any implementation, a robot can comprise a sub-set of the components illustrated in FIG. 2, including control subsystem 203, bus(es) 206, storage device(s) 208, and network interface subsystem 210.

Robot 200 includes a network interface subsystem 210 that is communicatively coupled to bus(es) 206 and provides bi-directional communicative coupling to other systems (e.g., external systems external to the robot 200) via a network or non-network communication channel 108. The network interface subsystem 210 includes one or more buffers. The network interface subsystem 210 may receive and send data related to information provided from and to input devices and output devices. The network interface subsystem 210 may receive and send data related to machine learning models.

Robot 200 includes an input subsystem 212 comprising one or more sensors that detect, sensor, or measure conditions or states of the robot and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. Robot 200 includes an output subsystem 214 comprising output devices, such as, speakers, lights, and displays. The input subsystem 212 and output subsystem 214, are communicatively coupled to the processor(s) 204 via bus(es) 206. In any of the implementations, the input subsystem 212 can include receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 218 includes arm and end-effector 154. The manipulation subsystem 218 is communicatively coupled to the processor(s) 204 via bus(es) 206.

A person of ordinary skill in the art will appreciate the components in robot 200 may be varied, combined, split, omitted, or the like. In any of the implementations, one or more of the network interface subsystem 210, input subsystem 212, output subsystem 214, propulsion or motion subsystem 216 and/or manipulation subsystem 218 can be combined. Alternatively, in any of the implementations, one or more of the subsystems (e.g., input subsystem 212) can split into further subsystems. Bus(es) 206 can, for instance, take the form of a plurality of buses (e.g., data buses, instruction buses, power buses) included in at least one body. For example, as part of a modular computing architecture where computational resources at distributed over the components of robot 200. That is, a robot, like robot 200, could, for example, have a processor in a left arm and a storage device in its thorax. In some implementations, computational resources are located in the interstitial spaces between structural or mechanical components of robot 200. A data storage device could be in a leg and a separate data storage device in another limb. In any of the implementations, the computational resources can be distributed over the body and can include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor 204 may be referred to in the singular, but may be two or more processors.

The network interface subsystem 210 may be any circuitry effecting bidirectional communication of processor-readable data, and processor-executable instructions. Suitable communication protocols include FTP, HTTP, Web Services, SOAP with XML, and the like.

The at least one storage device 208 is at least one nontransitory or tangible storage device. Storage device(s) 208 can include two or more distinct non-transitory storage devices. Storage device(s) 208 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The at least one storage device 208-1 includes or stores processor-executable instructions or data 250-1 associated with the operation of robot 200, system 100, and the like. Herein processor-executable instructions or data includes processor-executable instructions and/or processor-readable data.

The execution of the processor-executable instructions or data 250-1 cause the at least one processor 204 to carry out various methods and actions, for example via the propulsion or motion subsystem 216 and/or manipulation subsystem 218. Processor(s) 204 can cause a robot, such as robot 200, to carry out various methods and actions. Processor-executable instructions or data 250 can, for example, include a basic input/output system (BIOS) 252, an operating system 254, drivers 256, communication instructions or data 258, input instructions or data 260, output instructions or data 262, motion instructions or data 264, and executive instructions or data 266.

Exemplary operating systems for operating system 254 include ANDROID™, LINUX®, and WINDOWS®. The drivers 256 include processor-executable instructions and processor-readable data that allow processor(s) 204 to control circuitry of the robot 200. The processor-executable communication instructions or data 258 include processor-executable instructions to implement communications between the robot 200 and an operator console or terminal, a computer, or the like. The processor-executable input instructions or data 260 guide robot 200 in processing input from sensors in input subsystem 212. The processor-executable output instructions or data 262 guide robot 200 in interacting within the environment via components of the manipulation subsystem 218 or output subsystem 214. The processor-executable motion instructions or data 264 guide robot 200 in moving within its environment via components in propulsion or motion subsystem 216.

The processor-executable executive instructions or data 266 guide the robot 200 in reasoning, problem solving, planning tasks, performing tasks, and the like. The processor-executable executive instructions or data 266 implement, in part, the methods described herein.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 156 and microphone 158. Sensor information can, for example, include diagnostic sensor information that is useful in diagnosing a condition or state of robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

FIG. 2 schematically shows another example of a device including processor, a computer, such as, computer 106. Computer 106 shares some similar components with robot 200 but typically differs in lacking the propulsion or motion sub-system and the manipulation sub-system. The computer 106 has different sub-components within some sub-systems, such as, the input and output sub-systems.

Computer 106 includes at least one body or housing 202, and a control subsystem 203 that includes at least one processor 204, at least one nontransitory computer- or processor-readable storage device 208-2, and at least one bus 206 to which the at least one processor 204 and the at least one nontransitory computer- or processor-readable storage device 208-2 are communicatively coupled. Computer 106 includes a network interface subsystem 210 is communicatively coupled to the bus 206 and provides bi-directional communicative coupling to other systems (e.g., computers associated with observers, online storage providers) via network or non-network communication channel 108.

Computer 106 includes an input subsystem 212. In some implementations, subsystem 212 includes one or more user interface input devices such as a touch display, a keyboard, a mouse or other pointer device, a microphone, and a camera. In any of the implementations, input subsystem 212 can be coupled to the control subsystem 203 via the network interface subsystem 210. In any of the implementations, the input subsystem 212 can include one or more sensors such as environmental sensors.

The computer 106 includes an output subsystem 214 comprising one or more output devices, such as, displays, speakers, and lights. The input subsystem 212 and output subsystem 214, are communicatively coupled to processor(s) 204 via bus(es) 206.

Storage device(s) 208-2 includes or stores processor-executable instructions or data 250-2 associated with the operation of computer 106 and system 100. The processor-executable instructions or data 252-262 are described herein and with appropriate changes are applicable to computer 106. The processor-executable server instructions or data 282, which when executed by processor(s) 204, direct the computer 106 such that computer 106 coordinates the operation of system 100. The processor-executable interface instructions or data 284, which when executed by processor(s) 204, direct the computer 106 such that computer 106 receives and processes input from a user interface. The processor-executable application instructions or data 286, which when executed by processor(s) 204, direct the computer 106 such that computer 106 receives and processes input from a user interface. The processor-executable virtual environment instructions or data 288, which when executed by processor(s) 204, direct the computer 106 to create and manage a virtual world.

Figure 3:
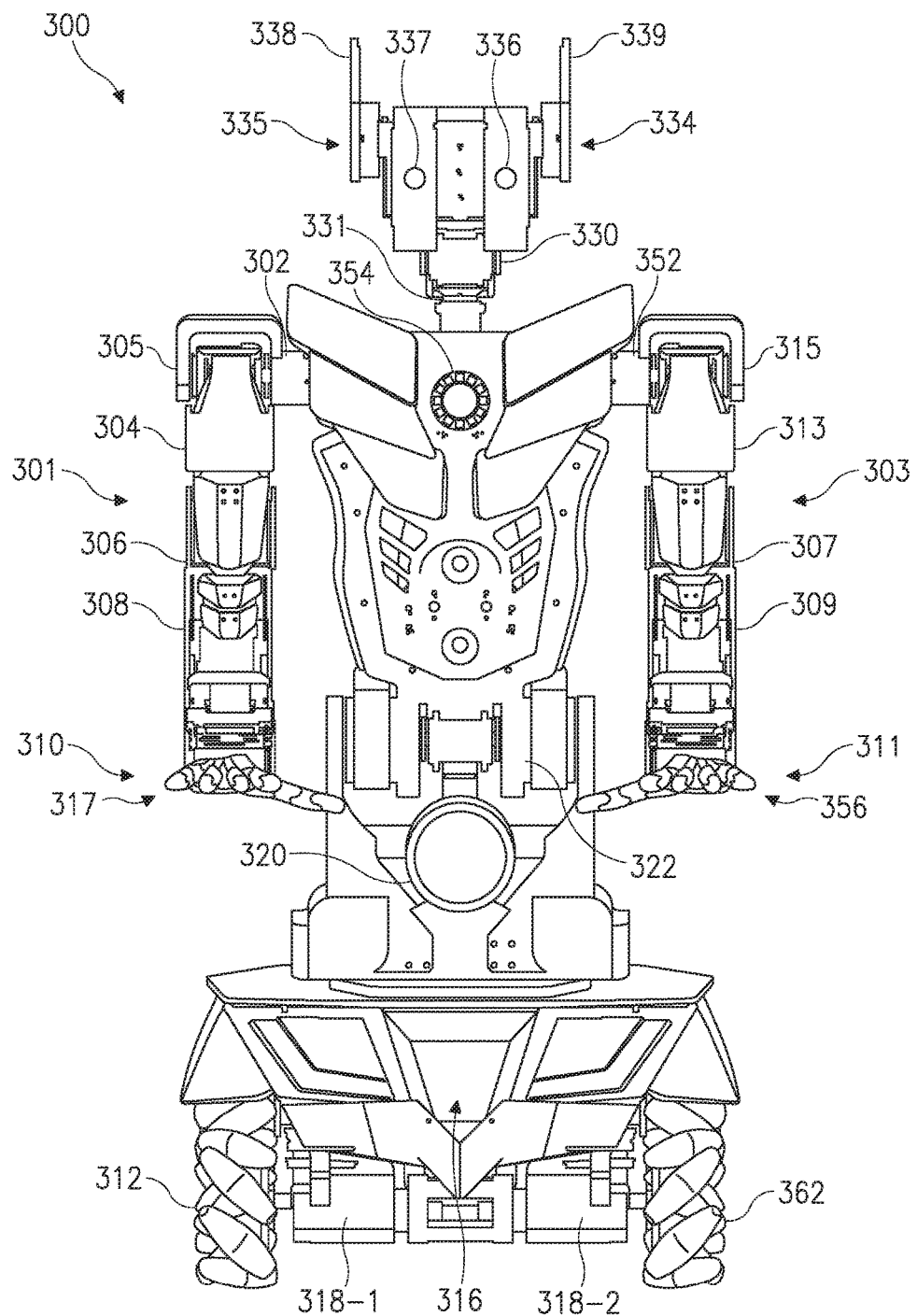
FIG. 3 is an elevation view illustrating an exemplary robot.

FIG. 3 illustrates an exemplary robot 300. As discussed herein, robots may take any of a wide variety of forms. These include human operator controllable robots, autonomous robots, and hybrid robot (i.e., partially autonomous, partially piloted). A robot comprises one or more bodies, also called structural components, or brackets. The bodies are coupled by joints, for example, bearings and/or servo-motors. For example, a first body is connected to a second body by a servo or the like. It is possible to describe a robot in terms of the joints or the bodies. FIG. 3 is described in terms of the joints but a person of skill in the art will appreciate a body based description is possible.

Robot 300 may include a first arm 301 including one or more of shoulder servo 302, a shoulder servo 305, an elbow servo 306, a wrist servo 308, and end-effector 310. Robot 300 may include a second arm 303.

Shoulder servos 302 and 305 may, for example, control and sense roll and pitch respectively of a shoulder of a first arm 301 of the robot 300. The shoulder servos 302 and 305 may, for example, be DYNAMIXEL™ MX-28, MX-64, or AX-12 servo-motors, produced by Robotis Co. Ltd. of Seoul, SK, although other electric motors or other actuators can be employed.

Shoulder yaw servo 304 may, for example, control and sense the yaw of first arm 301 of the robot 300. Shoulder yaw servo 304 may, for example, be a servo-motor like shoulder servos 302 and 305.

In some implementations, elbow servo 306 controls and senses one or more joint angles in an elbow of the first arm 301 of robot 300. Elbow servo 306 may, for example, be a servo-motor like shoulder servos 302 and 305, although other electric motors or other actuators can be employed.

Wrist servo 308 may, for example, control and sense an end-effector rotation of the robot 300. Wrist servo 308 may, for example, be a servo-motor as described herein and including servos for shoulder servos 302 and 305, although other electric motors or other actuators can be employed.

End-effector 310 may, for example, include a plurality of digits 317, one, more or all of which can be moveable with respect to one another. For example, four fingers and a thumb are shown in FIG. 3. A thumb is generally regarded as a digit that may be used to oppose two more digits. In the case of an opposed pair of digits the thumb may be the short or less mobile digit. The digits of the end-effector 310 may, for example, include embedded force sensitive resistors. Respective servos, which may, for example be DYNAMIXEL™ XL-320 servo-motors or TOWERPRO™ hobby servos, may operate each digit independently, although other electric motors or other actuators can be employed. The end-effectors may, in some implementations, facilitate dexterous manipulation of objects.

In any of the implementations, one or more digits of digits 317 of the end-effector 310 may optionally have polymer filled internal and external structure and/or rubber pads proximate to the extremities of the one or more digits of digits 317. The material may, in operation enhance grip capacity of an end-effector and simulate the resistance of a human finger.

In any of the implementations, digits, such as digits 317, may each optionally have one or more contact sensors and/or pressure sensors to sense pressure applied to the sensor and produce signals proportional to the pressure.

Second arm 303 may generally be similar to first arm 301, but mirrored across a central vertical or sagittal plane of the robot. Referring to FIG. 3, the second arm 303, for example, includes a shoulder roll servo 352, a shoulder pitch servo 315, a shoulder yaw servo 313, an elbow servo 307, a wrist servo 309, and end-effector 311 including a plurality of digits 356.

Robot 300 can, for example, include one or more locomotion components, for instance wheels, such as wheel pair 312 and wheel pair 362, and for instance an electronics compartment 316, DC motors 318-1 and 318-2, a speaker 320, a waist pitch servo(s) 322, an interlock 326 (to share torso support with waist pitch servo(s) 322), a single board computer (SBC) (not shown), one or more neck servos (e.g., two neck servos including a head pitch servo 330 and a head yaw servo 331), ear servos 334 and 335, cameras 336 and 337, microphones 338 and 339, lights/LEDs 354, and/or cable bundles (not shown).

Wheel pair 312 and wheel pair 362 provide the capacity for locomotion to the robot 300. Wheel pair 312 and wheel pair 362 may provide a broad base which, in some examples, increases stability of the robot 300. While two wheel pairs are illustrated, the robot can have a greater number of wheels. The wheels can, for example, take the form of mecanum wheels. The wheels can, for example take the form of ball transfer units. Mecanum wheels and ball transfer units allow a vehicle to strafe without appreciable skidding. Alternatively or additionally, the robot 300 can include one or more treads that provide locomotion.

Robot 300 can, for example, include one or more on-board power sources, for instance housed in the electronics compartment 316. The on-board power sources can, for example, include one or more batteries, ultra-capacitors, and/or fuel cells, or arrays of the same, to independently power different components of the robot 300. Servos can, for instance, be powered by different respective batteries.

Exemplary batteries include secondary cells, for instance lithium polymer cells, for example, a 4000 mAh 3 cell 12 V battery; a 5 V 9600 mAh, USB mobile charging power pack; and a batter pack including one or more 3.7 V lithium ion batteries.

FIGS. 4A and 4B schematically show parts of operator interface 400 as an example of operator interface 104. FIG. 4A shows a front elevation view of operator interface 400. FIG. 4B shows a side elevation view of operator interface 400 shown in FIG. 4A. Operator interface 400 is designed to be partially worn and partially stood on, and physically engageable by a human operator. Operator interface 400 may include an operator interface processor, computer and processor readable storage device, display, potentiometers, speakers, a microphone, an inertial measurement unit ("IMU"), a haptic glove or manipulator interface, and/or an input/output ("I/O") interface, all of which are in communication with the operator interface processor. As discussed above, an operator interface, generally similar to the operator interface shown in FIGS. 4A and 4B, may include fewer, additional, or alternative sensors, actuators, and/or output devices to those of operator interface 400.

Operator interface 400 can include one, more than one, or all of left/right audio output 402, a microphone 403, left/right visual display 404, a head/neck motion sensor 406, and first and second arm sensor assemblies 407 and 409.

First arm sensor assembly 407 includes a shoulder roll servo 408, a shoulder pitch servo 411, an upper-arm rotation capture device 410, an elbow servo 412, a lower-arm rotation capture device 414, a forearm mount or strap 416, and a manipulator interface or haptic glove 418. Second arm sensor assembly 409 may be generally similar to the first arm sensor assembly 407 but mirrored across a central vertical or sagittal plane of the operator interface 400. Second arm sensor assembly 409 includes a shoulder roll servo 450, a shoulder pitch servo 452, an upper arm rotation capture device 454, an elbow servo 456, a lower arm rotation capture device 458, a forearm mount 460, and a manipulator interface or haptic glove 462.

Operator interface 400 may include a set of two or more locomotion pedals 420, such as, first, second, and third locomotion pedals 413, 415, and 417, respectively. Operator interface 400 can also include a torso pitch interface 422 including, for instance an extension arm and a waist servo 425, a vest 424, an electronic back-box 426 and a chest/shoulder support structure 428.

The left/right audio output 402 (only one called out in Figures) may, for example, be implemented using speakers or headphones with speakers to provide an interface for receiving audio information from an operator controllable device, such as, a robot, to an operator using operator interface 400. Microphone 403 provides an interface for sending audio to an operator controllable device or may be used as part of a voice-to-command interface.

The left and right visual displays 404 may provide an interface for displaying visual information captured by cameras for the operator controllable device, e.g., cameras 336 and 337. The left and right visual displays 404 may additionally or alternative present other visual information generated for display on the left and right displays 404. An example of generated information which may be displayed on the left and right visual display 404 is an indication of battery charge levels of the operator controllable device or an animated sequence, for instance representing a path of movement of the operator controllable device or a portion thereof. The generated information can, for example, include one or more metrics for a robot, for instance as determined by one or more observers. The left and right visual display 404 can be implemented a virtual reality headset, such as, an OCULUS RIFT™, or ALTERGAZE™, available, respectively, from Oculus VR of Menlo Park, Calif., US; and Altergaze Ltd of London, UK.

The head/neck motion sensor 406 senses or captures movement of an operator's head, specifically pitch and yaw. Head/neck motion sensor 406 may, for example, include a gyroscope, an accelerometer, a magnetometer, and/or another inertial measurement unit (IMU). Head/neck motion sensor 406 can, for example, be part of, e.g., built into, a virtual reality headset.

Shoulder roll servo 408 and shoulder pitch servo 411 may sense or capture roll and pitch positioning of an operator's shoulder. The servos may include feedback resistors or potentiometers that provide signals representing servo position measurements. Shoulder servos 408 and 411 can, for example, sense or receive information about positions, and then simulate or replicate positions of corresponding shoulder servos in a robot, e.g., servos 302 and 305 respectively. Suitable servos 408 and 411 can, for example, take the form of DYNAMIXEL™ AX-12 servos, although are not limited to such.

Referring still to FIGS. 4A and 4B, in various implementations, upper arm rotation capture device 410 may sense or capture rotation of an upper arm of an operator. Upper arm rotation capture device 410 can, for example, include a first semi-circular gear mechanism that curls or wraps around the upper arm and couples with a second semi-circular gear mechanism at about 90 degrees to the first. The first and second semi-circular gear mechanisms can cooperatively transfer the rotation of the upper arm to the rotation of a potentiometer 470 to the second gear mechanism. The potentiometer 470 may be centered around or on the second gear mechanism.

A non-moving part of the potentiometer physically may couple to the operator's shoulder. The potentiometer can, for example, have a wider than normal central shaft with a hole in the center. A suitable potentiometer is, for example, a 39/20 mm Center Space Rotary Potentiometer, available from Panasonic Corp. of Osaka, JP, although other potentiometers can be employed.

In any of the implementations, elbow servo 412 may capture or sense an angle of an operator's elbow. A suitable elbow servo 412 can, for example, take the form of a DYNAMIXEL™ AX-12, although other servo motors can be employed. In some implementations, the elbow servo 412 simulates or replicates positions of the elbow servo of an operator controllable robot, e.g., servo 306 of robot 300.

Lower arm rotation capture device 414 may capture or sense the rotation of the lower arm of the operator. Lower arm rotation capture device 414 may, for example, operate generally similarly to the upper arm rotation capture device 410. Lower arm rotation capture device 414 can include a semi-circular gear or gear mechanism that wraps around the lower arm and couples with a second semi-circular gear or gear mechanism at 90 degrees to the first. This gear arrangement may transfer the rotation of lower arm to the rotation of a potentiometer 472 centered around and connected to the second gear or gear mechanism. A non-moving part of a potentiometer may, for example, be fixed to the operator's arm. A suitable potentiometer 472 may, for example, take the form of a 39/20 mm center space rotary potentiometer from Panasonic Corp., although other potentiometers may be suitable.

Forearm strap 416 may secure the first arm sensor assembly 407 of the operator interface 400 to the operator. Haptic glove 418 may, for example, capture or sense a position of the operator's pointer finger and thumb relative to one another. A servo 476 may be attached to haptic glove 418 at the center point of rotation of the thumb and pointer finger of the operator. The angular position of the servo may be controlled by two armatures 493 and 494 with rings allowing coupling of the operator fingers to the armatures. One armature is attached to the operator glove thumb 494 and the second armature is affixed to the operator glove pointer finger 493. The servo may, for example, provide feedback information garnered from an end-effector of the operator controllable device to the fingers of the operator using operator interface 400, for instance in the form of resistance, as the operator guides the operator controllable device to pick up an object. Haptic glove 418 may, for example, use a DYNAMIXEL™ AX-12 servo.

Haptic glove 418 may have a right vibrational device or buzzer 488, to vibrate with an amplitude or frequency that is a function of the signals coming from the finger pressure sensors of end-effector 310 of robot 300. The amplitude or frequency may, for example, increase with increasing sensed pressure. Right vibrational device 488 may be mounted on the back of the operator interface glove, or elsewhere on the haptic glove.

As discussed above, the second arm sensor assembly 409 mirrors and may be generally similar to the first arm sensor assembly 407. The upper arm rotation capture device 454 can, for example, include a potentiometer 480, the lower arm rotation capture device 458 can, for example, include a potentiometer 482, and the haptic glove 462 can, for example, include a servo 484 and a left vibrational device or buzzer 490.

A human operator may control locomotion pedals 420. An operator generally will selectively use one or both feet to move the pedals. Locomotion pedals 420 are arranged and tuned such that angles sensed or captured by the pedals control the motors 318 of robot 300 and thus control locomotion of robot 300. Left and right forward motion pedals 417 and 413 may operate independently triggering left and right wheel pairs 362 and 312 respectively of the motility subsystem of robot 300 and facilitate turning of robot 300.

Locomotion pedals 420 may include a reverse motion pedal 415 coupled to control both left and right wheels 362 and 312 shown in FIG. 3. The three pedals may be fixed to a single rubber mat to prevent movement or sliding during use. Each of the locomotion pedals 420 can, for example, include a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

Locomotion pedals 420 may include a pedal for the left drive train, a pedal for the right drive train, and a pedal for reverse. The left and right drive train pedals may, for example, provide signals which are combined to calculate a rotational and linear velocity of the operator controllable device.

The operator interface 400 may include foot operated user interfaces or user interface devices such as those described herein and shown in at least FIGS. 5 and/or 6.

A torso pitch interface 422, for example, captures or senses how much an operator has bent forward by sensing the angle of the operator's torso relative to their hips or legs. An extension arm 486 on which a servo 425 is mounted may connect to the operator interface 400 by a hinge. The extension arm may, for example, firmly connect to the operator's upper thigh. The waist servo 425 of the torso pitch interface 422 may, for example, be a DYNAMIXEL™ AX-12 servo, although other servos can be employed.

Vest 424 may, for example, provide a mount structure or mount for one, more than one, or all of the components of the operator interface 400. Vest 424 may attach and anchor operator interface 400 firmly to an operator's body.

Electronics box 426 (FIG. 4B) may, for example, be attached to vest 424 and may contain electronic components associated with the operator interface 400. The electronics box 426 may, for example, contain an ARDUINO PRO MINI™ microcontroller which captures the sensor signals from the potentiometers 470, 472, 480, and 482 and controls mounted on vest 424, power boards for the DYNAMIXEL™ bus, a power-breakout board which may also act as a patch panel including patching of the hand sensor signals and some ground pins, an ODROID™ computer, or processor-based device, which handles the wireless adapter for WIFI™ communication as well as a USB2AX connector, a Universal Serial Bus (USB) to Transistor-Transistor Interface (TTL), which allows the processor-based device to send signals to the DYNAMIXELS™. The processor-based device, e.g., ODROID™ processor-based device, may also send signals to the ARDUINO PRO MINI™ microcontroller. Electronic box 426 may also contain an ARDUINO UNO™ board which receives or captures position information from the pedals 420. Other computers, processors and/or boards may be employed. The ARDUINO PRO MINI™ microcontroller is available from Arduino LLC of Somerville, Mass., US. The ODROID™ computer, or processor-based device is available from Hardkernel Co., Ltd. of Seoul, SK.

The chest/shoulder support structure 428 allows for suspension of operator interface items from the frame rather than from the operator's limbs. The chest/shoulder support structure 428 may, for example, facilitate transfer of the weight of the operator interface 400 off the operator's arms onto the operators shoulder and back.

FIG. 5A schematically shows parts of user interface device 500. The user interface device 500 includes a frame 502, and a rod 504. Rod 504 is an elongated body generally extends along an axis, e.g., axis 505. Rod 504 has a first end and a second end, the second end spaced along a length of the rod from the first end. For example, the first end is distal to a human operator and the second end is proximal. In some implementations, the rod can depart from vertical by angle φ.

User interface device 500 can include a pivotable attachment, linkage, or hitch 506 connected to frame 502. Pivotable attachment 506 supports the mass of, and constricts the movement of, the first end of rod 504. Absent other constraints, pivotable attachment 506 allows the second end of rod 504 to move, e.g., swing, in two directions, e.g., up-down and left-right, or in any direction that is a combination of the two directions. Pivotable attachment 506 can, for instance, twist, turn, or rotate about the axis of the rod. For example, pivotable attachment 506 may be able to turn clockwise, or counter clockwise about axis 505. Pivotable attachment 506 can include a first part 506A and second part 506B, the first part 506A coupled to the first end of the rod and the second part 506B coupled to frame 502. Frame 502 can rest on, be attached to, or mounted or a floor 501.

User interface device includes an angle sensor (not shown). For example, the user interface device 500 can include an angle sensor housing 508 at least partially surrounding the angle sensor. In response to twist motion of rod 504 about the axis 505, angle sensor produces information that represents or characterizes the twist motion. This is an example of isotonic input in a user interface device. For example, the angle sensor provides an electrical signal the voltage of which is proportional to the degree of the twist motion. The angle sensor can include a first part and a second part, and the second part of the angle sensor surrounding and in rotary engagement with the first part. The angle sensor can, for example, be implemented via a rotatory potentiometer.

The angle sensor can, for example, be coupled to rod 504 at the second end of the rod. The angle sensor includes a first part coupled to rod 504. The angle sensor includes a second part in rotary and close fit engagement, e.g. surrounding, the first part. The second part of the angle sensor can, for example, be coupled to angle sensor housing 508. The second end of the rod 504 is coupled to a rigid body 510 extending outwardly from the rod via angle sensor housing 508. The angle sensor produces information that characterizes or represents rotation of the second part of the sensor, angle sensor housing 508, and/or body 510 about axis 505.

The angle sensor produces information that characterizes or represents rotation about axis 505. Axis 505 is generally vertical. That is, transverse to the major axis and minor axis of rigid body 510. Using anatomical references of a human operator for user interface device 500 the angle sensor produces information that characterizes rotation about an axis defined by the intersection of a coronal plane and a sagittal, e.g. median, plane of the user's body.

The angle sensor includes a spring 509 to return the first and second part of the angle sensor to a neutral position. A torque applied to rigid body 510 would stretch the spring 509, but rigid body 510 would return to neutral point when the torque is removed. In any implementation, a pair of springs can be included to return rigid body 510 after either a clockwise, or counterclockwise torque.

Angle sensor housing 508 or second part of the angle sensor can be connected to, and/or coupled to, the first part of the pivotable attachment 506. For example, connected or coupled to the inner gimbal of a two-part gimbal. The second end of rod 504 can, for example, be connected to rigid body 510. The second part of the angle sensor can, for example, be connected to, and/or coupled to the first part of pivotable attachment 506. The first part of the angle sensor can, for example, be connected to, and/or coupled to, rod 504 at or near the first end. The angle sensor produces information that characterizes or represents rotation of the first part of the sensor, rod 504, or body 510 about axis 505.

The angle sensor can, for example, include one or more Hall effect sensors and one or more magnets. One of at least one magnetic or at least one Hall effect sensor is included in the first part of the first part of angle sensor housing 508 and the other is included in the second part of the angle sensor. The relative locations of the at least one Hall effect sensor and the at least one magnet produce an electrical signal that characterizes or represents twist motion of rod 504 and/or body 510 about axis 505.

The user interface device 500 includes rigid body 510. For example, body 510 includes a platform, a bar, a frame, a piece, a footrest, or a pedal. The body 510 is coupled to the rod at, or toward, the second end of the rod. Body 510 extends outwardly from the rod. That is, generally perpendicular to the axis 505 when the rod is centered. Body 510 is sized and configured to a receive at least one foot from at least one human operator or user. The at least one operator may move body 510 and the rod in the directions described herein above. The at least one operator may apply forces or torques to body 510 in the directions described herein above. The body 510 is sufficient rigid such that it twits when the forces or torques are applied.

The pivotable attachment 506 can, for example, include a ball and socket joint, hitch, or linkage. For example, a socket is the first part of the pivotable attachment 506 is coupled to the frame. While the ball or first part of the pivotable attachment 506 is coupled to rod 504. Pivotable attachment 506 can, for example, include a plurality of gimbals. For instance, the pivotable attachment can include a first gimbal mounted to frame 502, and a second gimbal mounted in the first gimbal, and receiving the first end of rod 504.

FIG. 5B schematically shows, in plan view, parts of user interface device 500 along section A-A' in FIG. 5A. User interface device 500 includes a plurality of resilient members, e.g., members 507, coupled to the frame and resisting motion of the rod 504 in at least a first direction and in a second direction. The resilient members can for example take the form of one or more springs. Alternatively or additionally, the resilient members take the form of one or more dampers. For instance, the resilient members can comprise resilient material like rubber, synthetic rubber, or plastic elastomers. The first direction and the second direction may be orthogonal. Axes 520 and 522 are an example of a first direction and a second direction.

FIG. 5C schematically shows, in plan view, parts of user interface device 500 along section B-B' in FIG. 5A. The user interface device 500 includes one or more force sensors 544. For example, a first force sensor positioned between the frame 502 and the rod 504 produces information that represents force applied to the rod 504 in a first direction. That is, isometric input corresponding the first direction. The user interface device 500 can, for example, include a second force sensor positioned between frame 502 and rod 504 to produce information that represents force applied to the rod along a second direction. That is, isometric input corresponding to the second direction. The force can, for example, be a compression force. The force can alternatively or additionally be a tensile force. A convenient coordinate frame locates an origin at or near the first end of rod 504 and/or pivotable attachment 506. Thus, a direction and/or force can have a positive or negative value.

Figure 6B:
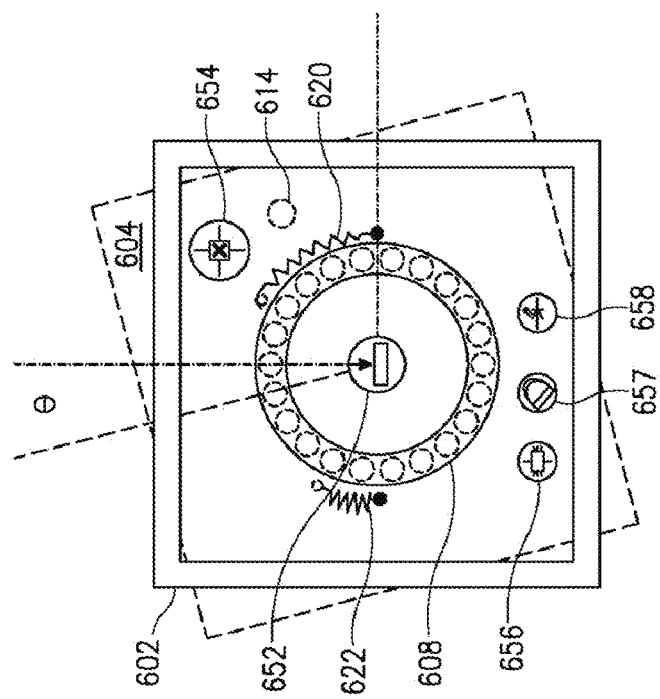
FIGS. 6A and 6B are schematic views illustrating an exemplary human operator interface including a rotatory bearing.
Figure 6A:
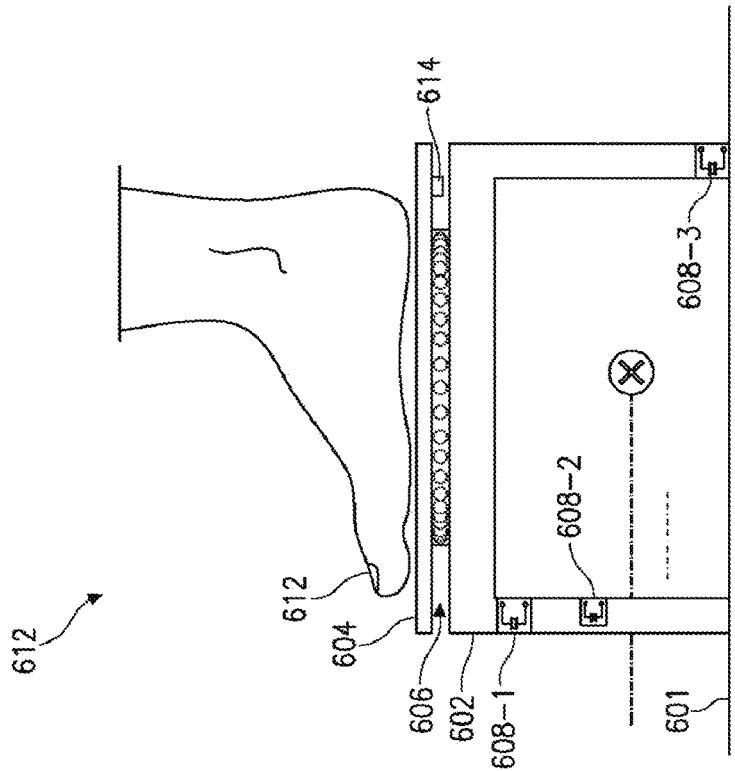

FIG. 6A schematically shows parts of user interface device 600. The user interface device 600 includes a frame 602, and a rigid body 604. Rigid body 604 can, for instance, be positioned above frame 602. Body 604 is sized and configured to a receive at least one foot from at least one human operator or user, e.g., foot 612. For example, body 604 includes a platform, a bar, a frame, a piece, a footrest, or a pedal. The body 604, for example, includes protrusions or voids to improve traction of foot 612 on body 604. One or more surfaces of body 604 can, for example, be coated or treated to improve traction. Frame 602 can rest on, be attached to, or mounted or a floor 601.

The rigid body 604 is in rotary engagement with the frame 602. For example, a rotary bearing 606 separates and couples frame 602 and rigid body 604. The rotary bearing 606 can take an axial load, such, a load on body 604 when positioned above frame 602. For instance, rotary bearing 606 can take the form of a thrust bearing. For example, a thrust ball bearing. In some implementations, rotary bearing 606 includes a first race coupled to frame 602, a set of rolling elements or rollers (e.g., spherical, cylindrical, conical) in engagement with the first race, and a second race in engagement with the rolling elements and coupled to rigid body 604.

The rigid body 604 is in rotary engagement with frame 602 about a generally vertical axis. That is, transverse to the major axis and minor axis of rigid body 604. Using anatomical references of a human operator for user interface device 600, e.g., user, owner of foot 612, the rotation is about an axis defined by the intersection of a coronal plane, and a sagittal, e.g. median, plane of the human operator's body.

User interface device 600 includes a plurality of force sensors 608 coupled to the frame. Force sensors 608 in response to force applied to the frame produce information that represents a first force component in a first direction with respect to the frame, and a second force component in a second direction with respect to the frame. User interface device 600 includes at least three force sensors 608 and, in some implementations, four sensors. For example, a force sensor is associated with each leg of frame 602. In response to downward force on frame 602 or rigid body 604 the force sensors in each leg produce information that characterizes or represents the downward force and the force in at least one direction that is orthogonal to down.

A force sensor can be included at various location for example between a leg and a span of the frame, e.g., sensor 608-1, within a leg, e.g., sensor 608-2, or beneath a leg, e.g., sensor 608-3. The force sensors can, for example, be located between frame 602 and floor 601 at the extreme corners of the frame.

Force sensors 608, in response to a downward force or load creates an electrical signal proportional to the load. Force sensors 608 can, for example, include or take the form of one or more of a strain gauge, or strain sensor. Force sensors 608 can include a deformable body. The load deforms the deformable body. The strain sensor is converts the deformation into an electric signal. The force sensors 608 can alternatively or additionally include or take the form of one or more piezoelectric sensors that produces an electrical current in response to a load, pressure or force. Force sensors 608 can alternatively or additionally include or take the form of one or more a capacitor where a separation distance between the plates of the capacitor varies with load, pressure, or force. An example of a pressure sensor is a pair of electrodes separated by VELOSTAT™ material. VELOSTAT™ is available from the 3M Company and is called LINQSTAT™ in some markets. The material is sheet, or web, of polyolefins, such as, high-density polyethylene, impregnated with a fine carbon powder. The conductivity of the sheet and thus conduction between the electrodes is correlated with applied pressure.

User interface device 600 can, for example, include one or more components, e.g., magnet 614, or surface treatments on the underside of body 604. The one or more components, e.g., magnet 614, or surface treatments maybe used as part of an angle sensor. User interface device 600 includes an angle sensor which is better shown in reference to FIG. 6B.

FIG. 6B schematically shows, in plan view, parts of user interface device 600. The user interface device 600 includes a frame 602, and a rigid body 604. A rotary bearing, e.g., thrust ball bearing, couples frame 602, and rigid body 604 disposed above the frame.

User interface device 600 can, for example, include an angle sensor comprising a first part and a second part. The first part is coupled to the frame, and the second part of the angle sensor is coupled to the body. In response to torque applied to rigid body 604, the angle sensor produces information that represents the rotary movement of the rigid body with respect to the frame. That is angle θ.

User interface device 600 can, for example, include an angle sensor comprising a rotatory potentiometer 652. Rotatory potentiometer 652 includes a first part and a second part, and the second part surrounds and is in rotary engagement with the first part. The first part can, for example be coupled to body 604 and moves cooperatively with the rotation of body 604. The second part can, for example, be coupled to the frame 602. Alternatively, the second part of rotatory potentiometer is coupled to body 604.

The user interface device 600 can, for example, include an angle sensor comprising at least one Hall effect sensor and at least one magnet. For example, Hall effect sensor 654 is mounted in frame 602 to detect at least one magnet coupled to body 604. For example, Hall effect sensor 654 detects the presence or absence of magnet 614 connected to the underside of body 604. The at least one magnet can, for example, be attached to or embedded in body 604.

The user interface device 600 can, for example, include an angle sensor comprising an optical distance sensor at a known point from center of rotation. As body 604 is in rotatory engagement with frame 602 measuring the distance along a circle on body 604 is directly proportional to the angle of rotation of body 604. A light source, e.g., light emitting diode(s), can, for example, be mounted on frame 602 to project towards body 604. The rigid body 604 may include an underside that has been painted, treated, or covered with spatially varying feature to reflect and scatter the light. The reflected and scattered light is detected at a sensor or image, for example, a low-resolution CMOS sensor, e.g., 18×18 pixels, at frame rate of about 10 images a second. The CMOS sensor acquires surface images of the underside of rigid boy 604. These images are processed by a digital signal processor (DSP) to determine the direction and distance of motion. Optionally, a lens images, e.g., focuses, the reflected and scattered light on to the CMOS sensor. A suitable sensor and DSP system is the Avago Technologies ADNS2610, integrated circuit, although other sensors can be employed. A suitable lens is a low numerical aperture, e.g., ¹⁄₁₀, polycarbonate, lens with focal length about equal to diagonal of CMOS sensor, although other lenses can be employed. A suitable light source is a red LED, such as Avago Technologies HLMP-ED80 LED, e.g., 639 nm wavelength, 5 mm package, although other light sources can be employed.

The user interface device 600 can, for example, include one or more springs positioned to return or bias the rigid body 604 to a neutral position. A counter clockwise torque applied to rigid body 604 would stretch the spring 620, which would, absent torque, return rigid body 604 would return to a neutral point. A clockwise torque applied to rigid body 604 would stretch the spring 622, which would, absent torque, return rigid body 604 to the neutral point. The springs 620 and 622 can, for example, run from an attachment point on frame 602 to attachment point on underside of rigid body 604. The springs 620 and 622 are, for example, under tension in the neutral position to allow for effortless compression when the opposite spring is stretched. The springs 620 and 622 can, for example, take the form of an elastic cord, or shock cord, e.g., 2 mm or 3 mm.

The user interface device 600 can, for example, include a frame 602, and a rigid body 604 coupled to the frame 602. In some implementations, rigid body 604 is positioned above the frame 602. The rigid body 604 is in rotary engagement with the frame 602. User interface device 600 also includes a plurality of force sensors 608 coupled to the frame which in response to force applied to the frame 602 produce information that represents or characterizes a first force component in a first direction with respect to frame 602, and a second force component in a second direction with respect to frame 602. For instance, the plurality of force sensors 608 provides information in response to a force applied on the rigid body. For example, a force in a substantially down direction. The user interface device 600 can, for example, include an angle sensor 650, comprising a first part and a second part. The first part is coupled to the frame, and the second part of the angle sensor is coupled to the rigid body. In response to torque applied to the rigid body, angle sensor 650 produces information that represents or characterizes rotary movement of the rigid body 604 with respect to the frame 602. For instance, user interface device 600 provides isometric input via the plurality of force sensors 608. Also for instance, user interface device 600 provides isotonic input via angle sensor 650.

Figure 7B:
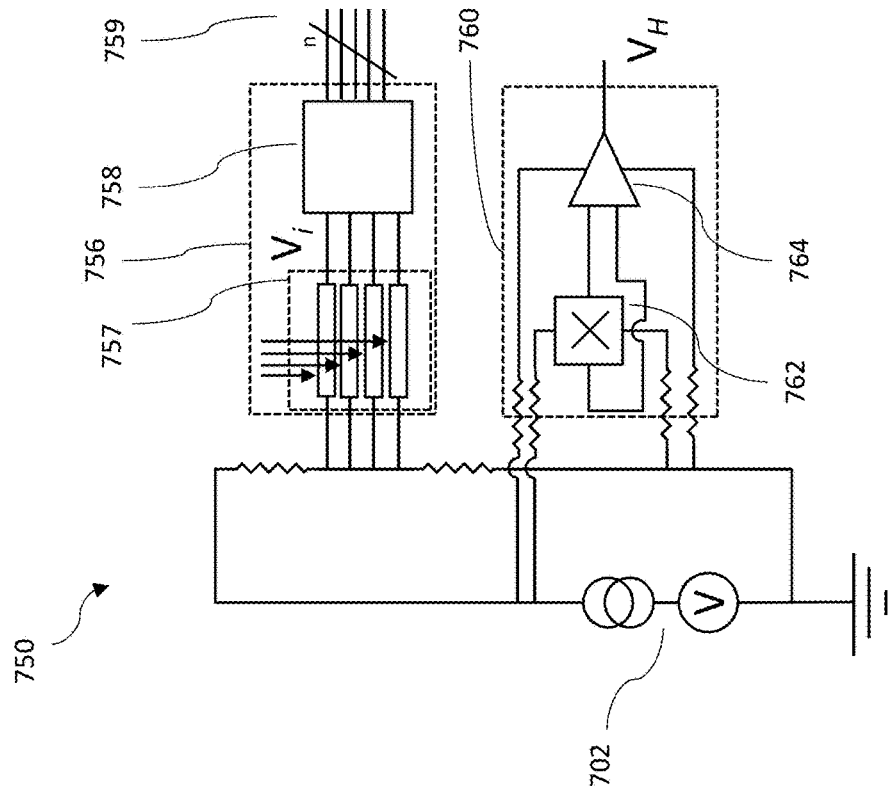
FIGS. 7A and 7B are schematic views illustrating partial circuits.
Figure 7A:
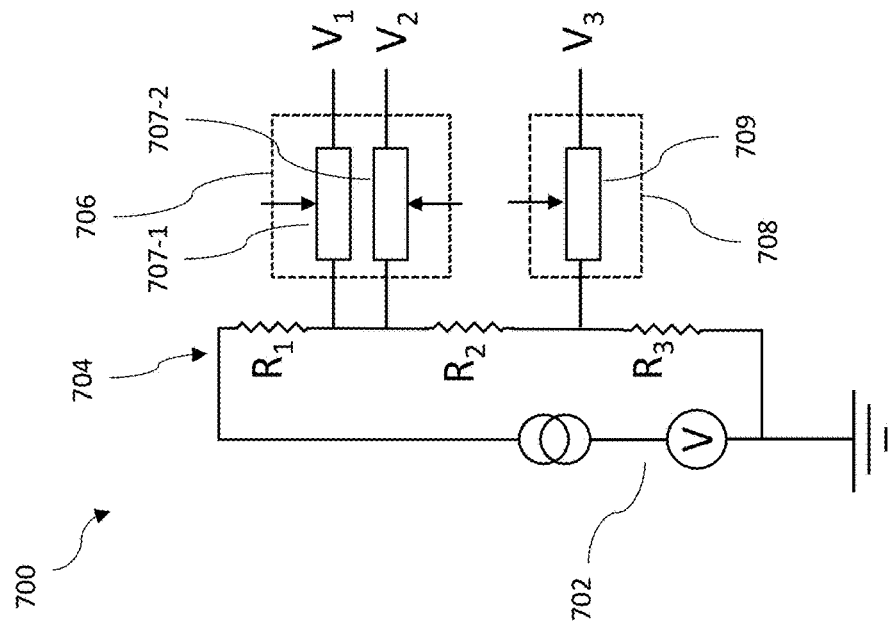

FIG. 7A is a schematic view illustrating a partial circuit 700. Circuit 700 is an example of circuitry suitable for user interface device 500. Circuit 700 includes a power source 702 supplying voltage and current. Circuit 700 can, for instance, include a plurality of resistors and other elements to create predefined potentials for parts of circuit 700. For example, resistors $R_1$, $R_2$, and $R_3$ are arranged as voltage dividers. A person of ordinary skill in the art would appreciate other arrangements of these circuit elements are possible.

Circuit 700 includes a plurality of variable resistors. The circuit 700 can, for example, include a force subsystem 706 associated with isometric input. The, force subsystem 706 can, for example, include a plurality of variable resistors 707. The variable resistors 707 are part of or model force sensors. For example, variable resistor 707-1 is associated with force in a first direction and variable resistor 707-2 is associated with force in a second direction. One or more variable resistors can be associated with a direction. In response to a mechanical action on variable resistors 707 electrical signal are created in circuit 700 at $V_1$, and $V_2$.

Circuit 700 includes at least one rotary potentiometer. Circuit 700 can, for example, include an angle subsystem 708 associated with isotropic input. Angle subsystem 708, for instance, includes at least one rotary potentiometer 709. In response to a mechanical action on potentiometer 709 an electrical signal is created in circuit 700 at $V_3$.

FIG. 7B is a schematic view illustrating a partial circuit 750. Circuit 750 is an example of circuitry suitable for user interface device 600. Circuit 750 includes a power source 702 supplying voltage and current. Circuit 750 can, for example, include a plurality of resistors and other elements to create predefined potentials for parts of circuit 750.

Circuit 750 includes a plurality of potentiometers. Circuit 750 can, for example, include a force subsystem 756 including potentiometers 757 associated with isometric input. For example, potentiometers 757 are associated with force sensors in the frame of user interface device 600. The plurality of signals $V_i$ in circuit 750 corresponds to signed directional forces applied to a frame, e.g., frame 602. Alternatively, the plurality of signals $V_i$ does not represent or characterize a clear direction signal. In any implementations, a microcontroller 758 extracts direction and/or magnitude data from plurality of signals $V_i$ and creates a binary representation 759 of the forces applied to force subsystem 756 and/or any associated frame such as frame 602.

Circuit 750 includes a Hall effect sensor as an example of an angle sensor. Circuit 750 can, for example, include an angle subsystem 760 associated with isotropic input. Angle subsystem 760 can, for example, include at least one Hall effect sensor 762. The output of the Hall effect sensor can be amplified by, for example, an operational amplifier 764.

Figure 8:
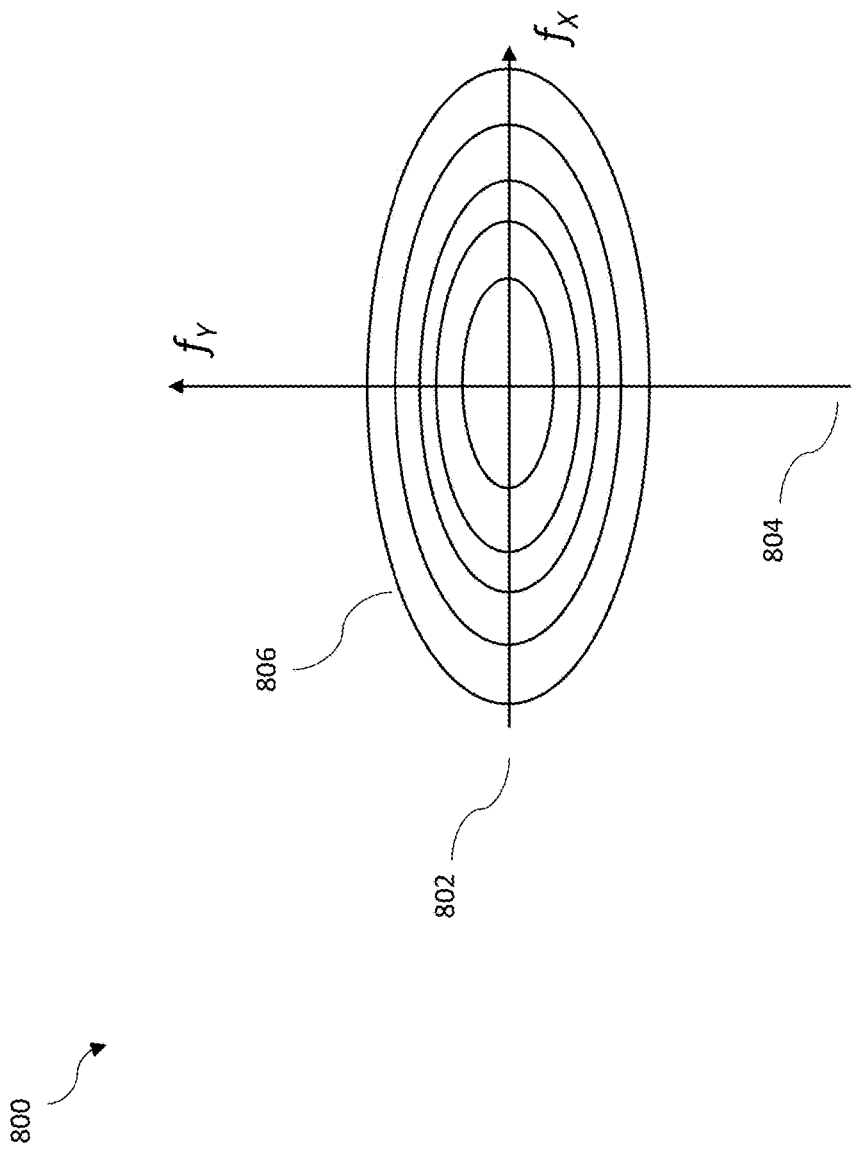
FIG. 8 is a line plot schematically illustrating an example of a transfer function for an isometric input to a user interface device.

FIG. 8 is a line plot 800 schematically illustrating an example of a transfer function. A transfer function maps positions of, or forces on, a user interface device to output values or response. Examples of output values include speed, i.e., absolute value of velocity, for a robot in a physical space or avatar in a virtual space.

Plot 800 includes a first axis 802 and a second axis 804. Force in a first direction, for example, X direction, is associated with first axis 802. Force in a second direction, for example, Y direction, is associated with second axis 804.

Plot 800 includes contours of equal output 806. For plot 800 the response function is more sensitive to force in the Y direction. The transfer function can, for example, include smoothing regions to filter out noise. The transfer function can, for example, include emphasize high frequency components to give the transfer function the appearance of being associated with a low mass body.

EXAMPLE

A robot system comprising a user interface device and a robot coupled by a communication channel. The user interface device includes a frame, a pivotable attachment, and a rod. The rod extends along an axis and has a first end and a second end. The pivotable attachment is coupled to the first end of the rod and is attached to the frame. The second end of the rod may move relative to the frame while the first end remains fixed. The user interface device further includes a first angle sensor coupled to the frame that in response to pivot motion of the rod along a first direction produces information that represents pivot motion of the rod along the first direction. The user interface device further includes a second angle sensor coupled to the frame that in response to pivot motion of the rod along a second direction produces information that represents pivot motion of the rod along the second direction. The first direction and the second direction are orthogonal. The user interface device includes a rigid body attached to the rod toward the second end of the rod, and extending outwardly from the rod. The user interface device includes a third angle sensor coupled to the rod that in response to twist motion of the rod about the axis produces information that represents twist motion of the rod about the axis.

The robot includes a motion subsystem, at least one processor, communicatively coupled to the first angle sensor, the second angle sensor, the third angle sensor, and the motion subsystem, and at least one processor readable storage media communicatively coupled to the at least one processor. The at least one processor readable storage media stores processor readable instructions therein which when executed causes the at least one processor to cause the robot to move in a first robot direction at a rate proportional to pivot motion of the rod along the first direction, and cause the robot to move in a second robot direction, transverse to the first robot direction, at a rate proportional to pivot motion of the rod along the second direction, and cause the robot to rotate around an axis at a normal to a plane defined by the first robot direction and the second robot direction, and at a rate proportional to twist motion of the rod about the third direction.

The first angle sensor is, for example, selected from the group consisting of a potentiometer, and a Hall effect sensor and magnet pair. The second angle sensor is, for example, selected from the group consisting of a potentiometer, and a Hall effect sensor and magnet pair. The third angle sensor is, for example, selected from the group consisting of a potentiometer, and a Hall effect sensor and magnet pair.

The first end of the rod is, for example, distal to a user at a user interface, and the second end of the rod is, for example, proximal to the user at the user interface. The frame is, for example, mounted on the floor. The pivotable attachment, for example, includes a first gimbal mounted to the frame, and a second gimbal mounted in the first gimbal, and receiving the first end of the rod.

The rigid body is, for example, sized to receive at least one foot of at least one human operator. The rigid body includes a platform.

The third angle sensor, for example, includes a first part connected to the rigid body, and a second part coupled to the rod. The third angle sensor, for example, includes a first part that is connected to the rod, and a second part coupled to the body. The motion subsystem, for example, further includes a first wheel, a second wheel, a third wheel, and a fourth wheel, and processor readable instructions which when executed by the at least one processor cause the at least one process to cause the robot to move in the first robot direction wherein when the robot moves in the first robot direction the first wheel, the second wheel, the third wheel, and the fourth wheel turn in the a first wheel direction, or second wheel direction.

The first wheel, a second wheel, a third wheel, and a fourth wheel are, for example, mecanum wheels. The processor readable instructions which when executed by the at least one processor cause the at least one process to cause the robot to move in the second robot direction. When the robot moves in the second robot direction: the first wheel in the first wheel direction, the second wheel in the second wheel direction, the third wheel turns in the first wheel direction, and the fourth wheel turns in the second wheel direction.

The motion subsystem, for example, further comprises a first wheel, a second wheel, a third wheel, and a fourth wheel, and processor readable instructions which when executed by the at least one processor cause the at least one process to cause the robot to rotate around the axis wherein when the robot rotates the first wheel and the third wheel turns in the first wheel direction, and the second wheel and the fourth wheel turn in the second wheel direction.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user interface device comprising:
a frame;
a rigid body physically coupled to, positioned above, and free to rotate relative to the frame;
a plurality of resilient members resisting motion of the rigid body in a first direction with respect to the frame, and a second direction with respect to the frame;
a plurality of force sensors coupled to the frame which in response to force acting on the rigid body produces a plurality of pieces of information that represents a magnitude of a first force component in the first direction with respect to the frame, and a magnitude of a second force component in the second direction with respect to the frame, wherein the plurality of pieces of information represent isometric input to the user interface device; and
an angle sensor, including a first part and a second part, the first part is coupled to the frame, and the second part of the angle sensor is coupled to the rigid body, which in response to torque applied to the rigid body produces information that represents rotary movement of the rigid body with respect to the frame about an axis extending vertically through the rigid body;
wherein the plurality of resilient members are located completely above the plurality of force sensors.

2. The device of claim 1, further comprising:
a pivotable support connected to the frame;
a rod extending along an axis and having a first end and a second end, wherein:
the first end of the rod is coupled to the pivotable support, and
the rigid body is coupled to the rod toward the second end of the rod and extends outwardly from the rod.

3. The device of claim 2 wherein the first end of the rod is distal to a user at a user interface, and the second end of the rod is proximal to the user at the user interface.

4. The device of claim 2 wherein the pivotable support includes a first part mounted to the frame, and a second part mounted in the first part, and receiving the first end of the rod.

5. The device of claim 4 wherein the first part of the angle sensor is coupled to the rod, and the second part of the angle sensor is connected to the second part of the pivotable support.

6. The device of claim 2 wherein the first part of the angle sensor is connected to the rod, and the second part of the angle sensor is coupled to the body.

7. The device of claim 2, further comprising a spring including a first end and a second end, wherein the first end is coupled to the rod and the second end is coupled to the second part of the angle sensor, and positioned to resist a torque applied to the rigid body.

8. The device of claim 2 wherein the plurality of force sensors comprises:
a first force sensor that in response to force applied in first direction produces information that represents degree of force applied to the rod along the first direction; and
a second force sensor that in response to force applied in second direction produces information that represents degree of force applied to the rod along the second direction.

9. The device of claim 2, further comprising:
a microcontroller that in response to receiving the plurality of pieces of information creates a representation of magnitude and direction of force acting on the user interface device.

10. The device of claim 2 wherein the plurality of resilient members are located completely above the pivotable support.

11. The device of claim 10 wherein the plurality of force sensors are located completely above the pivotable support.

12. The device of claim 1 wherein the information that represents rotary movement characterizes isotonic input to the user interface device.

13. The device of claim 1 wherein the plurality of force sensors measure tensile forces and compression forces.

14. The device of claim 1 wherein the plurality of pieces of information further represents a third force component in a third direction with respect to the frame, and the third direction is substantially downwards.

15. The device of any of claim 1 or 2 wherein the rigid body is of a size to receive at least one foot of at least one human operator.

16. The device of claim 15 wherein the rigid body comprises a platform.

17. The device of claim 1 wherein the frame is mounted on a floor.

18. The device of claim 1, wherein the rigid body is in rotatory engagement with the frame.

19. The device of claim 1, wherein a first member of the plurality of resilient members is positioned along a first axis parallel to the first direction and a second member of the plurality of resilient members is positioned along a second axis parallel to the second direction.

20. The device of claim 1 wherein the plurality of resilient members are located directly above the plurality of force sensors.

21. The device of claim 20 wherein the plurality of resilient members includes a first resilient member positioned on a first side of the rod, a second resilient member positioned on a second side of the rod opposite to the first side, a third resilient member positioned on a third side of the rod, and a fourth resilient member positioned on a fourth side of the rod opposite to the third side.

22. The device of claim 21 wherein the plurality of force sensors includes a first force sensor positioned on the first side of the rod, a second force sensor positioned on the second side of the rod, a third force sensor positioned on the third side of the rod, and a fourth force sensor positioned on the fourth side of the rod.

23. The device of claim 22 wherein the first resilient member extends along a first axis and is configured to exert a force extending along the first axis against the rod to resist motion of the rod toward the first side, the second resilient member extends along the first axis and is configured to exert a force extending along the first axis against the rod to resist motion of the rod toward the second side, the third resilient member extends along a second axis and is configured to exert a force extending along the second axis against the rod to resist motion of the rod toward the third side, and the fourth resilient member extends along the second axis and is configured to exert a force extending along the second axis against the rod to resist motion of the rod toward the fourth side.

24. The device of claim 23 wherein the first force sensor extends along a third axis parallel to the first axis and is configured to produce a piece of information that represents a force component exerted along the third axis toward the first side, the second force sensor extends along the third axis and is configured to produce a piece of information that represents a force component exerted along the third axis toward the second side, the third force sensor extends along a fourth axis parallel to the second axis and is configured to produce a piece of information that represents a force component exerted along the fourth axis toward the third side, and the fourth force sensor extends along the fourth axis and is configured to produce a piece of information that represents a force component exerted along the fourth axis toward the fourth side.

25. The device of claim 24 wherein the first and second axes are horizontal, intersect one another, and are angularly spaced apart from one another by ninety degrees, and the third and fourth axes are horizontal, intersect one another, and are angularly spaced apart from one another by ninety degrees.

26. The device of claim 1 wherein the angle sensor comprises a potentiometer.

27. The device of claim 1 wherein the angle sensor comprises a Hall effect sensor and at least one magnet.

28. The device of claim 1 wherein the angle sensor comprises an optical movement sensor.

29. A device comprising:
a frame;
a rigid body physically coupled to, positioned above, and free to rotate relative to the frame;
a plurality of resilient members resisting motion of the rigid body in a first direction with respect to the frame, and a second direction with respect to the frame;
a plurality of force sensors coupled to the frame which in response to force applied to the rigid body produces a plurality of pieces of information that represents a magnitude of a force component in the first direction with respect to the frame, and a magnitude of a force component in the second direction with respect to the frame, wherein the plurality of pieces of information represent the isometric input to the device; and
an angle sensor, including a first part and a second part, the first part is coupled to the frame, and the second part of the angle sensor is coupled to the frame, which in response to torque applied to the rigid body produces information that represents rotary movement of the rigid body with respect to the frame about an axis extending vertically through the rigid body;
wherein the plurality of resilient members are located completely above the plurality of force sensors.

30. The device of claim 29 wherein the angle sensor comprises a potentiometer.

31. The device of claim 29 wherein the angle sensor comprises a Hall effect sensor and at least one magnet.

32. The device of claim 29 wherein the angle sensor comprises an optical movement sensor.

33. The device of claim 29 wherein the rigid body is of a size to receive at least one foot of at least one human operator.

34. The device of claim 29 wherein the rigid body comprises a platform.

35. The device of claim 29 wherein the frame is mounted on a floor.

* * * * *